Figure 1:
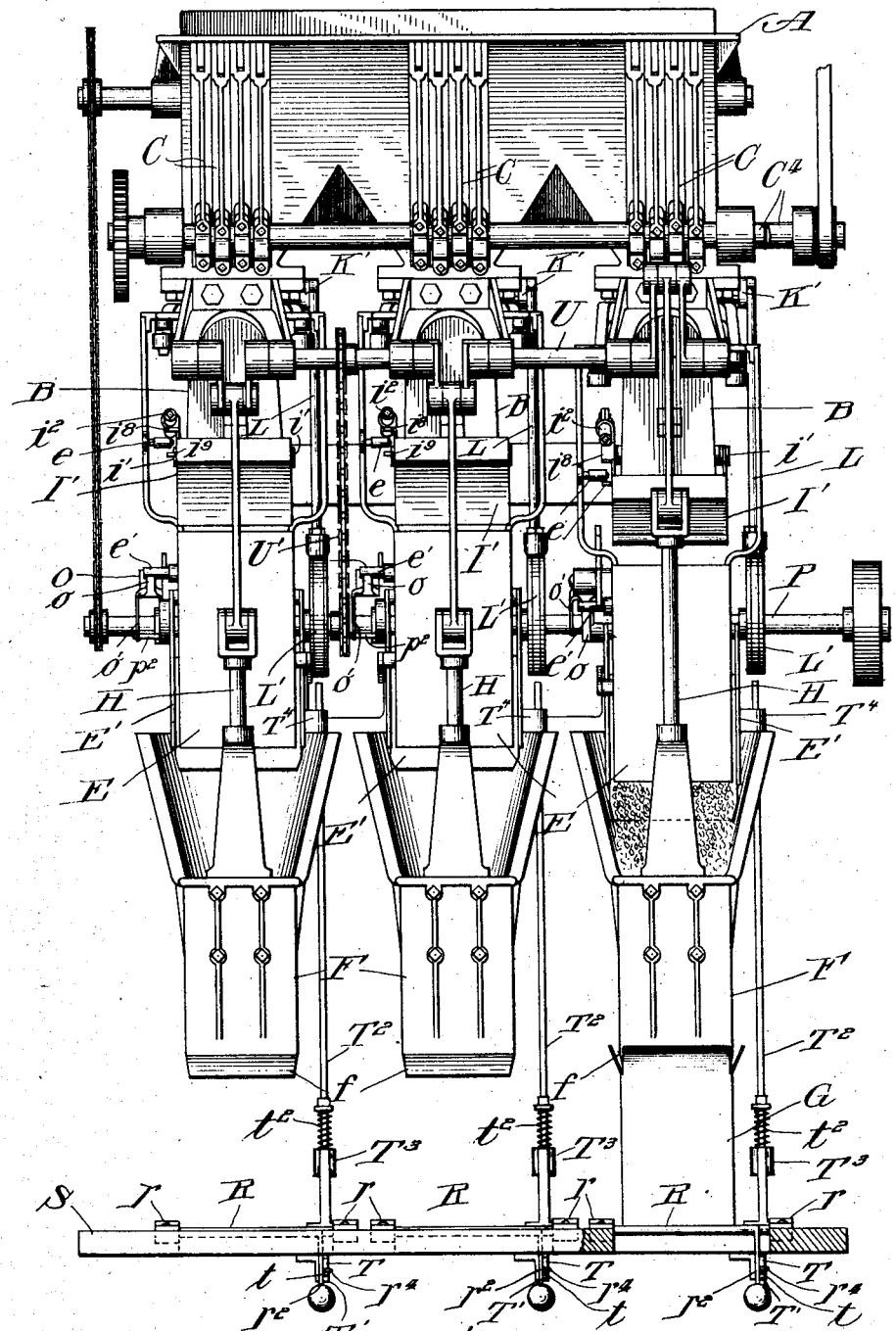

G. HOEPNER.
AUTOMATIC WEIGHING MACHINE.
APPLICATION FILED JULY 20, 1908.

956,853.

Patented May 3, 1910.
5 SHEETS—SHEET 2.

Witnesses:
Harry S. Gaither
Ruby V. Nash.

Inventor:
George Hoepner
by Walter H. Chamberlin
Atty

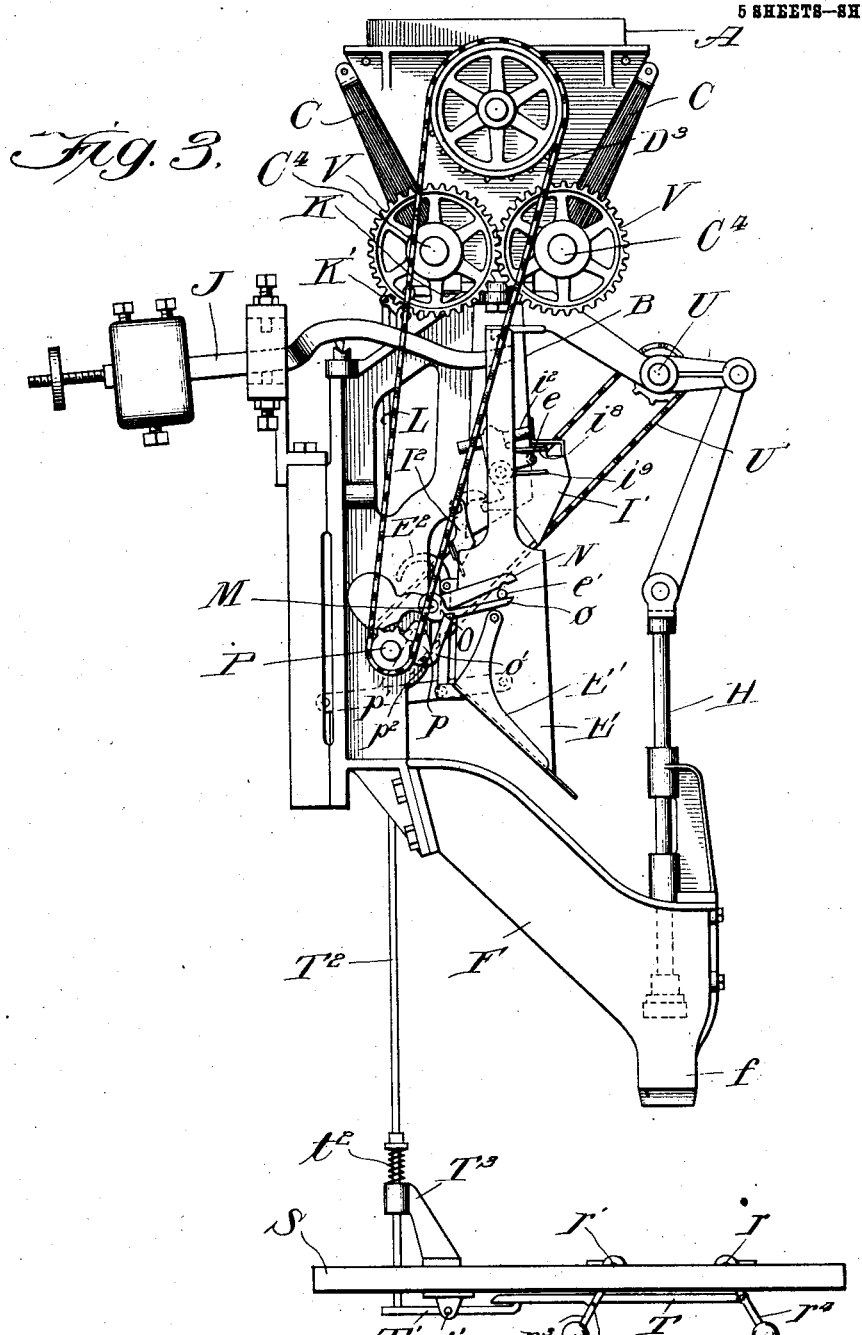

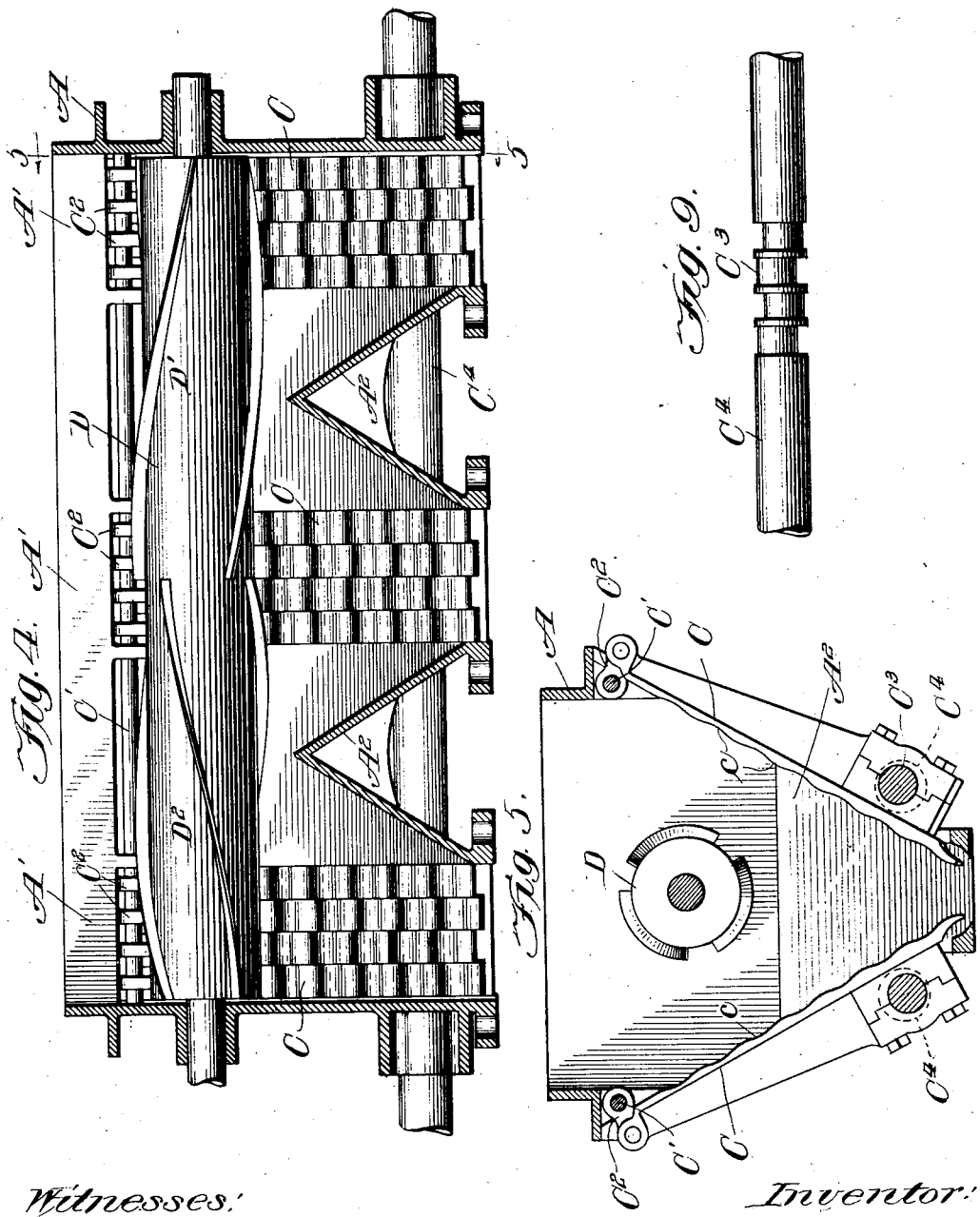

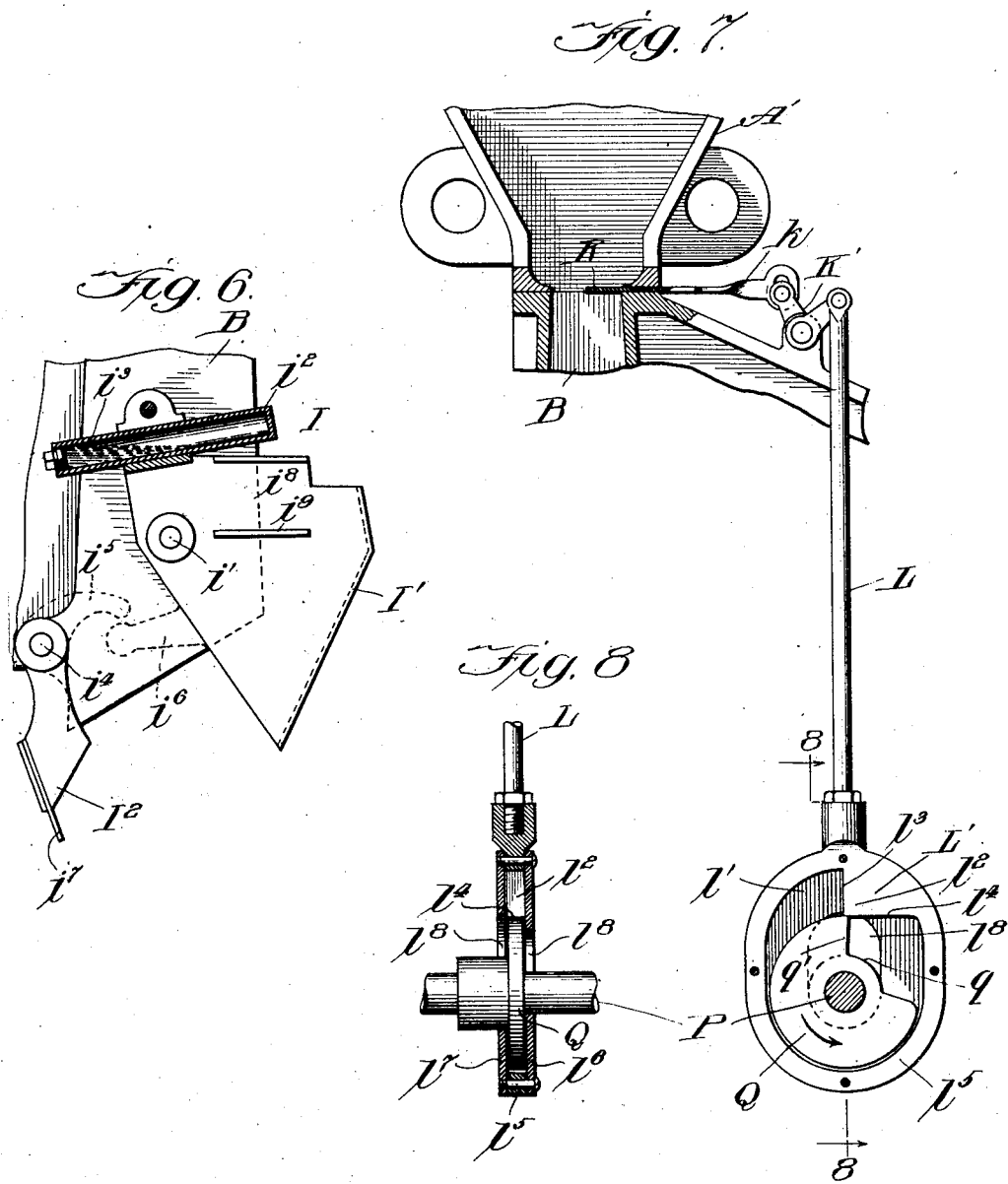

UNITED STATES PATENT OFFICE.

GEORGE HOEPNER, OF CHICAGO, ILLINOIS.

AUTOMATIC WEIGHING-MACHINE.

956,853.  Specification of Letters Patent.  Patented May 3, 1910.

Application filed July 20, 1908. Serial No. 444,316.

*To all whom it may concern:*

Be it known that I, GEORGE HOEPNER, a citizen of the United States, residing at Chicago, county of Cook, State of Illinois, have invented a certain new and useful Improvement in Automatic Weighing-Machines, and declare the following to be a full, clear, and exact description of the same, such as will enable others skilled in the art to which it pertains to make and use the same, reference being had to the accompanying drawings, which form a part of this specification.

My invention relates to machines for automatically and progressively separating a mass of loose material into a plurality of equal units of a predetermined weight, and has for its object to simplify and improve such machines.

Although most of the materials which it is desired to market in individual packages have heretofore been successfully weighed out automatically in predetermined quantities, yet there have been some materials which have offered such difficulties that it has heretofore been found expedient to weigh and package them entirely by hand. This has been true of materials of a sticky character of which seeded raisins are an example. In seeding raisins the seeds are forced outwardly through the skin leaving perforations in one or both sides of the raisins through which the pulp exudes more or less, thus rendering the raisins extremely sticky and causing them to tend to adhere together and to any apparatus with which it is attempted to handle them.

A further object of the present invention is to provide a machine which will act upon seeded raisins and similar sticky materials so as to separate them automatically in an efficient and reliable manner into equal small units of a predetermined weight.

A further object of the present invention is to provide a weighing machine wherein the major portion of the load is separated from the main mass independently of the weighing receptacle or scale beam while the completion of the load is under the control of the receptacle or scale beam.

A further object of the present invention is to provide a simple and novel arrangement for relieving the weighing receptacle from the shock incident to dumping the major portion of the load into it.

A further object of the present invention is to provide a simple and novel arrangement whereby a carton or other package may be held in operative relation to a filling funnel or spout during the process of filling and be automatically removed after the filling has been completed.

A further object of the invention is to provide a novel form of hopper wherein the tendency of goods to wedge themselves in place is completely counteracted.

Figure 2:
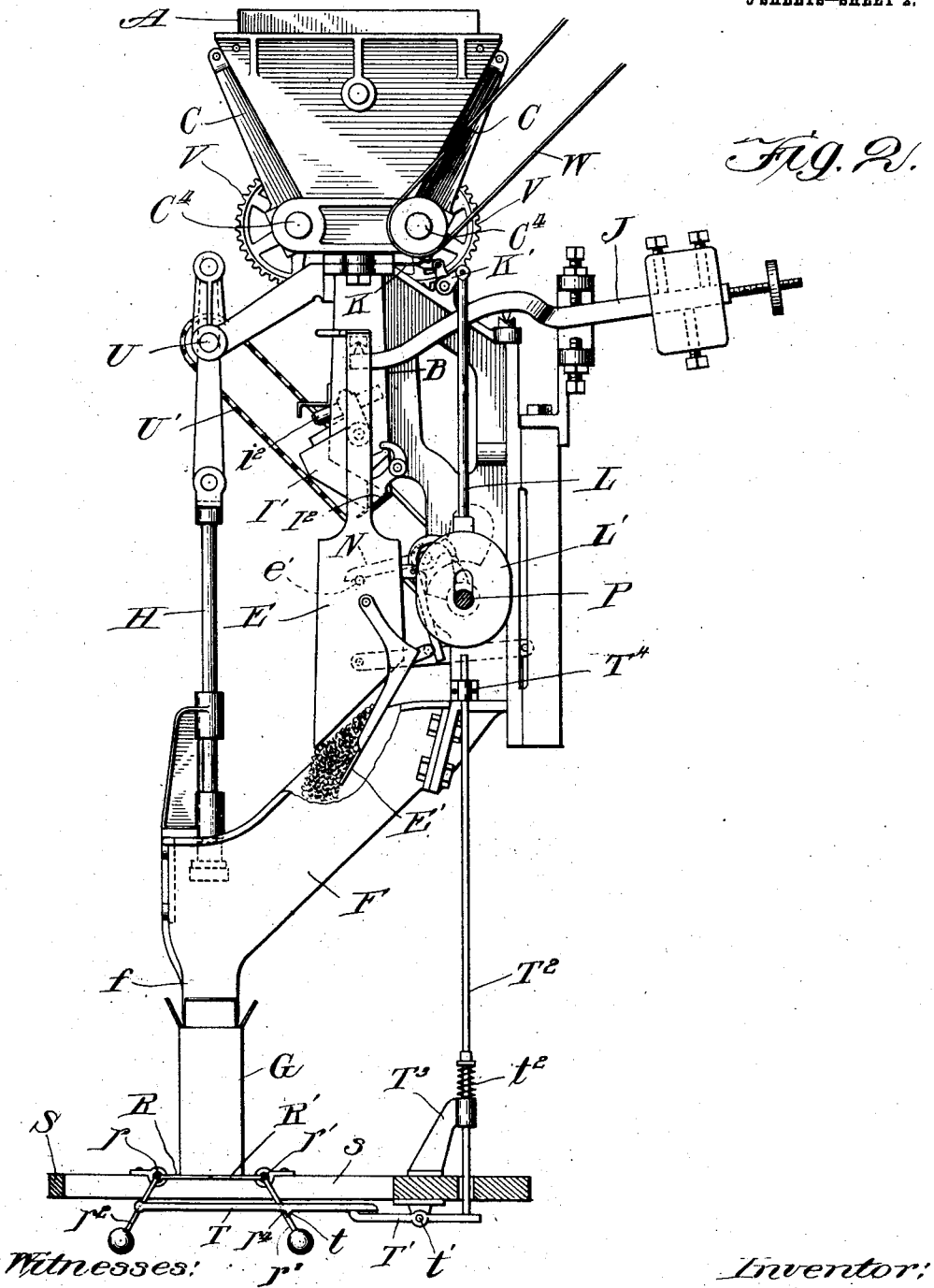

The various features of novelty whereby my invention is characterized will be hereinafter pointed out with particularity in the claims, but for a full understanding of my invention and of its various objects, including those above enumerated as well as others, reference is to be had to the following detailed description taken in connection with the accompanying drawings, wherein:

Figure 1 is a front elevation of a battery of three machines arranged in accordance with a preferred form of my invention; Fig. 2 is a view looking toward the right of Fig. 1, showing the extreme right hand machine in the same condition as in Fig. 1; Fig. 3 is a view looking toward the left in Fig. 1, showing the left hand machine in a slightly different position from that indicated in Fig. 1, namely in the condition wherein the weighing receptacle has just received the main portion of its load; Fig. 4 is a longitudinal section through the common hopper for the several machines; Fig. 5 is a section taken on line 5—5 of Fig. 4; Fig. 6 is a fragment of the auxiliary hopper showing the discharge gates open; Fig. 7 is a section taken through the point of meeting of the main and auxiliary hoppers, showing the main gate or valve and the operating mechanism therefor; Fig. 8 is a section taken on line 8—8 of Fig. 7, and Fig. 9 is a fragment of an eccentric shaft associated with the main hopper.

In the drawings I have illustrated the various features of my invention as applied to machines of the kind disclosed in my Patent 855,578; but it will of course be understood that my invention is not limited to this particular form of weighing machine but its various features may be used wherever they may be of advantage or utility.

Referring to the drawings, A indicates a hopper which supplies three auxiliary hoppers B. The material to be weighed is fed to the large hopper in any suitable manner and from this hopper to three different weighing receptacles through the auxiliary hoppers B.

One of the chief difficulties encountered in packaging seeded raisins is that the raisins stick together and also upon the walls of the hoppers and funnels through which it is necessary to pass them. Consequently accurate and reasonably rapid weighing has heretofore been practically impossible. Since the trouble begins as soon as the main hopper is reached I have devised an arrangement whereby the raisins will be fed from the hopper in a substantially positive manner without, however, damaging them. I have shown the main hopper as divided into three separate sections A' by forming in the bottom thereof two upwardly projecting wedge-shaped members A². A description of one of the sections will therefore suffice for all. The two outer downwardly inclined side walls of the hopper section are removed so as to leave the hopper open. Lying side by side and closely together within each of the openings are a number of strips C, these strips completely filling the opening. The upper ends of each set of strips are preferably suspended from a shaft C' by means of links C² which are loosely carried upon said shafts and pivotally connected to the tops of the members C. The lower ends of these members surround and are borne by eccentrics C³ fixed to shafts C⁴ arranged closely to the sides of the hoppers. It will be seen that upon rotating the shafts C⁴ the elements of which each of the two side walls of the hopper is composed will be moved up and down, the upper ends of these elements traveling through a slight arc about the shafts C⁷ while the lower ends are moved inwardly and outwardly a distance corresponding to the throw of the eccentrics. The angular positions of the eccentrics upon their shafts are not the same, a convenient arrangement being such that each of the elements is in its raised position when the two adjacent elements are in their lowermost positions and vice versa. This is the arrangement shown, it being most clearly indicated in Fig. 4. It will thus be seen that, by rotating the shafts C⁴ in any suitable manner the two converging side walls of the hopper are made to move with a gentle undulating effect the lower ends having a much greater movement than the upper ends and acting continually to lift the mass of material in the hopper upwardly and toward the center. By off-setting the eccentrics the effectiveness of the movable walls is increased since a greater loosening action upon the material is obtained.

The inner surfaces of the members C are preferably corrugated as indicated at c, these corrugations affording the members a grip upon the material contained within the hopper.

If desired a screw D may extend across all three of the hopper sections, one end D' of the screw being right-handed and the other end, D², being left-handed. By rotating this screw the material is slowly fed from the ends toward the middle and it is maintained in a partially loosened state so that the work of the movable side walls of the hopper is diminished and consequently their effectiveness increased.

From the several hopper sections just described the material to be weighed is fed into the auxiliary hoppers B. These auxiliary hoppers are made slightly bell-shaped, that is, larger at the bottom than at the top. Consequently any material which is deposited in these auxiliary hoppers has no opportunity to become wedged in place or even to adhere to the sides. From the auxiliary hoppers the material passes to the weighing receptacles E of which there is one beneath each hopper. These receptacles may take any suitable form, but they are preferably also made bell-shaped, being wider at the bottom than at the top so that after a load has been accurately weighed it will be discharged with certainty and in its entirety, insuring that upon the discharge of the receptacle an accurately weighed unit will be delivered. After the material has been discharged from the receptacles it may conveniently be received in chutes F having at their lower ends spouts f about which cartons or other packages G may be telescoped.

If it is desired to compress the material in the packages or cartons a plunger H may be provided for traveling up and down through each of the spouts f. These plungers are so timed that after the charges have been deposited in the cartons the plungers descend and press the charges to a predetermined level.

In order to make the weighing operation both rapid and accurate I have provided means for measuring out almost the entire load of each receptacle independently of the receptacle and then, while the receptacle is entirely free, adding thereto a drip until the receptacle is over-balanced and, in over-balancing, checks the drip. To this end each of the auxiliary hoppers is provided with a discharge gate I of any suitable type, but preferably made of two sections I' and I² as indicated. These gates are so arranged that if they are moved slightly beyond a predetermined point in either direction they will continue until they reach the open or the closed position depending upon the direction in which they are started. A very effective form of gate is that illustrated most clearly in Fig. 6. The gate I' is pivotally connected to the lower end of the auxiliary hopper as at $i'$. This gate when in its closed position covers the larger portion of the outlet at the bottom of the hopper. A tube $i^2$ for containing a suitable rolling or shifting weight $i^3$, which I have illustrated as consisting of mercury, is secured to this gate member at a point above its point of support, it being arranged to extend transversely. When the gate is in the position shown in Fig. 6 the mercury is at the left-hand end of the tube and holds the gate in its open position. Upon swinging the gate about its pivot so as to bring the tube approximately horizontal the mercury will shift to the right-hand end of the tube and the gate will then close by gravity. The gate $I^2$ is pivoted at one side of the hopper as at $i^4$ and is provided with an arm $i^5$ which is adapted to be engaged by an arm $i^6$ projecting laterally from the other gate so that when the main gate closes the auxiliary gate is also caused to close. The auxiliary gate is preferably made so that when free to do so it will swing open by gravity; consequently there is no need of a positive connection between the two gates. The auxiliary gate is preferably provided with a projecting flange $i^7$ of rubber or other yieldable material which engages with the lower edge of the other gate member in the closed positions of the gates. Consequently if one or more raisins should be caught between the edges of the two gate members they would not be crushed, the flexible flange yielding sufficiently to permit the bottom of the hopper to be closed even though one or more raisins be caught between the closing gates.

The weighing receptacles which are supported upon the ends of any suitable type of scale beams J are provided with laterally projecting rollers $e$ which lie between a pair of transverse flanges $i^8$ and $i^9$ upon the gate member I'. When the gates are closed and the receptacle swings upwardly after having discharged its load, the roller engages with the upper flange $i^8$ and partially opens the gates. As soon as the main gate has been moved past the critical angle the completion of the opening is effected by means of the shifting weight. When the receptacle descends, the roller engages with the lower flange $i^9$ on the gate and swings the gate in the closing direction until the critical angle is again passed, whereupon the gate automatically completes its closing movement. The flanges with which the roller on the receptacle engages are preferably so located that the receptacle is left entirely free after the gates have been swung in one direction or the other, this being particularly true at the time the receptacle is in its raised position. Consequently the weighing may be done with extreme accuracy.

Between each section of the main hopper and the corresponding auxiliary hopper is a gate K this being preferably in the form of a thin sliding member. An arm $k$ projects laterally from the gate K and is connected to one arm of a bell crank lever K'. The other arm of the lever is connected to an operating rod L which is actuated in a manner to be hereinafter described. When the gate K is opened the material is allowed to flow freely from the main into the auxiliary hopper. When the gate is partially closed it provides a drip opening through which the material is fed slowly. The operating mechanisms are such that at the time a receptacle is discharged and the lower end of its auxiliary hopper is closed, the gate K will be opened sufficiently long to permit almost the entire charge for the receptacle to be deposited in the auxiliary hopper. The gate K is then partly closed and, when the receptacle ascends and uncovers the bottom of the auxiliary hopper the major portion of the load is dropped into the hopper and thereafter a small drip stream passes through the opening left between the two hoppers, through the auxiliary hopper and into the weighing receptacle. When the load has been completed the receptacle descends, closing the gates at the bottom of the auxiliary hopper in the manner previously described, consequently the gates act only upon the drip stream and are capable of closing readily thereby insuring that the supply will be cut off as soon as the receptacle is filled.

Arranged in rear of the several receptacles is a shaft M upon which are carried arms N, there being one of these arms for each receptacle. Each of these arms is adapted to overlie a pin $e'$ projecting from the side of the receptacle so that when the arm is swung downwardly the receptacle is positively forced in the same direction. On this same shaft are pivoted a series of supporting members O, there being one supporting member for each of the receptacles. Each of these members has an arm $o$ underlying the laterally projecting pin $e'$ and an arm $o'$ which projects downwardly and is adapted to be engaged by means of a traveling stop of any kind.

The discharge gates E' of the receptacles are preferably of the kind shown in my prior patent, being held closed by means of dogs $E^2$ pivoted upon the back of the receptacles.

P is the main shaft of the machine and it carries cams $p$ arranged to engage with the rear ends of the arms N so as to force the front ends of these arms downwardly against the pins on the receptacles; cams $p'$ for engaging with the dogs $E^2$ and tripping the gates of the receptacles; and also pins $p^2$ which are so positioned as to engage with the depending arms $o'$ of the members O just as and for a short time after the receptacles reach their uppermost positions after having discharged their loads. While one of the pins $p^2$ is in engagement with the corresponding arm $o'$ the receptacle with which these parts are associated is locked against downward movement. It will be seen that this locking of the receptacles takes place coincidently with the discharge of the main portion of the load from the auxiliary hoppers to the receptacles so that the shock of the falling load is borne by a rigid abutment. Shortly after the main portion of the load has been dumped into a receptacle the corresponding supporting member O is released from engagement with the pin $p^2$ so that the receptacle is free to descend as soon as the drip stream has completely supplied the load. The main shaft may also conveniently carry a series of cams Q which are surrounded by shoes L' secured to the lower ends of the operating rods L for the gates K. The cams Q may be substantially circular in form with a section removed so as to provide a recess $q$ bounded on one side by a shoulder $q'$. The shoe L' is provided with an elongated opening $l'$ which surrounds the corresponding cam. In one corner of this opening is an inwardly extending projection $l^2$ having a vertical shoulder $l^3$ and a horizontal shoulder $l^4$. It will be seen that as the cam revolves in the counterclockwise direction (viewing it as in Fig. 7) the shoulder $q'$ passes the edge $l^3$, whereupon the entire shoe drops, the projection $l^2$ entering the recess $q$ of the cam. In dropping the shoe carries the gate K from the position indicated in Fig. 7 to a position wherein the mouth of the auxiliary hopper is completely opened. Thereafter as the cam continues its rotation it strikes against the horizontal edge $l^4$ and gradually raises the shoe thereby returning the gate to the position indicated in Fig. 7. The gate is then held in its partly closed position while the cam completes a movement equal to the greater portion of a circle.

When the shoe drops in the manner described, so as to completely open the gate K a mass of material is dumped into the auxiliary hopper, either filling it completely or only partially as may be desired. When the shoe is raised again so as to partially close the gate the material will continue to drip into the auxiliary hopper, provided that it is not already full. When the receptacle rises and permits the material to be dumped from the auxiliary hopper the drip stream is either continued or resumed (depending upon whether the auxiliary hopper was full or not) and passes directly through the auxiliary hopper into the receptacle. When the receptacle is full and descends the gates at the lower end of the auxiliary hopper are closed and the drip stream continues to flow into the hopper until the gate between the hoppers is entirely opened, whereupon the material will flow faster until the gate is again closed in the manner described.

The shoe L' may be formed in any suitable manner. Thus it may consist conveniently of an inner block $l^5$ and two outer plates $l^6$ and $l^7$ secured thereto, each of these plates having therein an opening $l^8$ elongated in the vertical direction so as to clear the shaft during the movement of the shoe.

In order to support the carton while it is being filled I have provided a pair of platform members R and R' which are hinged at $r$ and $r'$ respectively so as to be capable of swinging into vertical planes. These members may conveniently be arranged in a slot $s$ of a table or the like S. Depending from the members R and R' are a pair of weighted arms $r^2$ and $r^3$ respectively, these arms being so arranged that they tend normally to hold the members R and R' in a horizontal plane. The parts are locked with the supporting members in a horizontal plane by means of an arm T which is pivoted at one end to the arm $r^2$ and has a hook $t$ in position to engage with a pin $r^4$ on the other weighted arm. When the hook is in place the carton is firmly held against downward movement but when the hook is lifted so as to free it from the pin the weight of the carton and contents is enough to swing the two platform members about their hinges so as to permit the carton to drop vertically through the slot in the table. The tripping of the member T may be accomplished in any suitable manner thus, for example, a hinged dog T' may be pivoted beneath the table as at $t'$ one end of this dog projecting below the free end of the member T. Above the opposite end of the dog rises a rod $T^2$ slidably supported in suitable brackets $T^3$ and $T^4$ on the table and the frame of the weighing machine respectively, beneath and in the plane of the shoe L' associated with the corresponding scale. Normally the rod $T^2$ is held in its raised position by means of a spring $t^2$. When the shoe L' drops, it strikes the upper end of the rod and forces the rod downwardly, thereby turning the dog T' on its pivot and kicking the hook which locks the two platform members out of engagement with the pin $r^4$. The carton is then free to drop and after it has dropped the weighted arms on the platform members return them to their initial positions and the hook drops into a locking position by gravity.

The main shaft may be driven in any suitable manner and clutched and unclutched in any suitable manner to a source of power. The crank shaft U for operating the plungers may be driven from the main shaft by means of a sprocket chain U'. Similarly the member D in the hopper may be driven slowly by means of a sprocket chain D³ actuated by the main shaft. The shafts C⁴ may be geared together and either one may be driven in any suitable manner, as for example, by means of a belt W from the counter-shaft. It will then be seen that my improved machine will weigh quickly and accurately due to the separation of the main portion of the load independently of the weighing receptacle and permitting the receptacle to be delicately poised at the time of completing the load: furthermore materials may be operated upon without danger of injury because of the use of a gate between the hoppers which never closes completely and a second gate which has a flexible portion whereby a stream may be checked even though some material may have become lodged between the flexible portion and the member which coöperates therewith to effect the closure. When seeded raisins and the like are to be operated upon all danger of clogging is avoided by reason of the gentle yet positive agitating device in the main hopper and the peculiar shapes of the auxiliary hopper and the weighing receptacle.

It will of course be understood that when my improved machines are used in the form of a battery as illustrated the mechanisms are adjusted as in my aforesaid patent so that the several machines deliver their charges in rotation.

While I have illustrated and described in detail only a preferred embodiment of the various features of my invention, I do not desire to be limited to this particular embodiment, since in its broader aspects the various features of my invention may take various other forms, may be used in other situations, and may be combined together in a single machine or used separately as will be evident from the terms employed in the definitions of my invention which constitute the appended claims.

Having now fully described my invention, what I claim as new and desire to secure by Letters Patent is:

1. In a weighing machine, a weighing receptacle, means independent of the receptacle for separating from a mass of material the main portion of the load for the receptacle and forming a restricted passage to deliver a drip, and means actuated by the receptacle for admitting the main load and the drip to the receptacle and for checking the drip upon the completion of the load.

2. In a weighing machine, a weighing receptacle, a supply hopper, an auxiliary hopper, means independent of the receptacle for delivering the main portion of a load for the receptacle from the supply hopper to the auxiliary hopper and forming a drip passage between the hoppers, a discharge gate associated with said auxiliary hopper, and means on said receptacle for actuating said gate.

3. In a weighing machine, a weighing receptacle, a supply hopper, an auxiliary hopper, a gate between said hoppers, means for actuating said gate so as to deposit a portion of a load for the receptacle and then reduce the gate-opening to a drip passage, a discharge gate on said auxiliary hopper, and means on said receptacle for actuating said latter gate.

4. In a weighing machine, a hopper, a discharge gate associated with said hopper, said gate being constructed and arranged to assume automatically the open position and the closed position after passing a predetermined position in one direction or the other, a weighing receptacle, and a lost motion connection between said gate and said receptacle for causing the gate to be carried past said predetermined position upon the ascent and the descent of the receptacle, said connection being so arranged as to leave the receptacle free of the gate when the receptacle is in its raised position.

5. In a weighing machine, a hopper, a discharge gate associated with said hopper, said gate being constructed and arranged to assume the open and the closed positions automatically after passing a predetermined position depending upon the direction in which it approaches said predetermined position, a weighing receptacle, and means associated with said receptacle for moving said gate past said predetermined position both upon the ascent and the descent of the receptacle.

6. In a weighing machine, a supply hopper, an auxiliary hopper beneath the supply hopper, a sliding gate arranged between said hoppers, a discharge gate associated with said auxiliary hopper, a weighing receptacle, means independent of the weighing receptacle for actuating said sliding gate between a position wherein it is wholly open and a position wherein it is still partially open, and means on said receptacle for actuating said discharge gate.

7. In a weighing machine, a supply hopper, an auxiliary hopper, a gate between said hoppers movable between limits wherein it is wholly open and wherein it is still partially open, means for actuating said gate, a discharge gate for said auxiliary hopper, a weighing receptacle beneath said auxiliary hopper, and means on said receptacle for actuating said latter gate.

8. In a weighing machine, a supply hopper, an auxiliary hopper beneath said supply hopper, a weighing receptacle beneath said auxiliary hopper, a gate between said hoppers arranged to be movable within limits wherein it is wholly open and wherein it is still partially open, means for actuating said gate, a discharge gate associated with said auxiliary hopper and arranged to assume the open or the closed position after being moved past a predetermined position in one direction or the other, and means associated with said receptacle for actuating said latter gate past said predetermined position during the ascent and the descent of the receptacle.

9. In a weighing machine, a funnel, a tilting platform arranged beneath the funnel in position to support a carton telescoped upon the funnel, a lock for normally holding said platform, and means for actuating said lock.

10. In a weighing machine, a weighing receptacle, means for delivering a load to said receptacle, a funnel beneath said receptacle, power-actuated mechanism for causing the receptacle to discharge into said funnel, a movable platform for supporting a carton telescoped about said funnel, said platform being arranged to be actuated by a filled carton to permit the carton to drop from the funnel, a device for normally locking said platform in position to hold the carton in place about the funnel, and means controlled by said mechanism for releasing said device after a carton has received a charge.

11. In a weighing machine, a funnel, means for delivering a charge into said funnel, a tilting platform for supporting a carton in telescopic relation to the funnel, said platform being arranged to tilt under the weight of a filled carton so as to permit the carton to drop from the funnel, a lock for normally holding said platform against tilting, and means for releasing said lock.

12. In a weighing machine, a weighing receptacle, a supply hopper, an auxiliary hopper, a gate between said hoppers movable within limits wherein it is wholly open and wherein it is still partially open, power-actuating mechanism for moving said gate at predetermined intervals, a discharge gate for said auxiliary hopper, a weighing receptacle beneath said auxiliary hopper, and means associated with said receptacle for causing said discharge gate to close when the load in the receptacle reaches a predetermined weight.

13. In a weighing machine, a weighing receptacle, means independent of the receptacle for separating from a mass of material at predetermined intervals the main portion of a load for the receptacle and forming a restricted passage to deliver a drip, and means controlled by the receptacle for admitting the main portion of a load and the drip to the receptacle and for checking the drip upon the completion of the load.

14. In a weighing machine, a weighing receptacle, means for separating from a mass of material at predetermined intervals the main portion of a load for the receptacle and forming a restricted passage to deliver a drip, means controlled by the movement of the receptacle for admitting the main portion of the load and the drip to the receptacle and for checking the drip upon the completion of the load, and means for automatically compelling the receptacle to move in the direction for checking the drip at predetermined intervals.

15. In a weighing machine, a weighing receptacle, a supply hopper, an auxiliary hopper, a gate located between said hoppers and constructed and arranged to be movable between limits wherein it is wholly and wherein it is still partially open, a power-driven shaft, connections between said shaft and said gate for moving said gate at predetermined intervals, a discharge gate for said auxiliary hopper, a weighing receptacle beneath said auxiliary hopper, means associated with said receptacle for opening said discharge gate and for causing it to close when the load in the receptacle reaches a predetermined amount, and means connected with said shaft for compelling said receptacle to move in the direction for causing said discharge gate to close at predetermined intervals.

16. In a weighing machine, a supply hopper, an auxiliary hopper, a gate between said hoppers movable between limits wherein it is wholly open and wherein it is still partially open, power-actuated mechanism for operating said gate at predetermined intervals, a discharge gate for said auxiliary hopper, a weighing receptacle, means associated with said receptacle for controlling the latter gate, a device connected with said mechanism for compelling said receptacle to move downwardly once in each predetermined interval, and a device associated with said mechanism for locking the receptacle against downward movement at the time such discharge gate is open.

17. In a weighing machine, a supply hopper, an auxiliary hopper, a gate between said hoppers, power-actuated mechanism for operating said gate at predetermined intervals, a discharge gate for said auxiliary hopper, a weighing receptacle, means associated with said receptacle for controlling said discharge gate, a platform for supporting a carton in position to receive the contents of said receptacle, a lock for said platform, and a device operated by said mechanism for releasing said lock.

18. In a weighing machine, a weighing receptacle, means for delivering a load to said receptacle, a movable platform for supporting a package in position to receive the contents of said receptacle, power-actuated mechanism for compelling said receptacle to discharge, and means associated with said mechanism for locking said platform.

19. In a weighing machine, a weighing receptacle, means independent of the receptacle for separating from a mass of material at predetermined intervals, a charge equal to the main portion of a load for the receptacle, means controlled by the receptacle for causing said charge to be dropped into the receptacle, a device for supporting the receptacle during delivery of said charge, and means for actuating said device so as to release the receptacle after the delivery of said charge.

20. In a weighing machine, a weighing receptacle, power-actuated means for separating from a mass of material at predetermined intervals, a charge equal to the main portion of a load for the receptacle, means controlled by the receptacle for causing said charge to be dropped into the receptacle, a device for supporting the receptacle during delivery of said charge and connections between said device and said power-actuating mechanism for moving said device into and out of operative relation with respect to said receptacle.

21. In a weighing machine, a weighing receptacle, power-actuated mechanism for separating from a mass of material at predetermined intervals, a charge equal to the main portion of a load for the receptacle, means controlled by the receptacle for causing said charge to be dropped into the receptacle and devices associated with said mechanism for compelling the receptacle to move up and down during predetermined intervals.

In testimony whereof, I sign this specification in the presence of two witnesses.

GEORGE HOEPNER.

Witnesses:
HARRY S. GAITHER,
RUBY V. NASH.